May 21, 1935.  S. H. OWENS  2,002,440
MOVABLE ABUTMENT FOR CONTAINER VEHICLES
Filed April 28, 1932   7 Sheets-Sheet 1
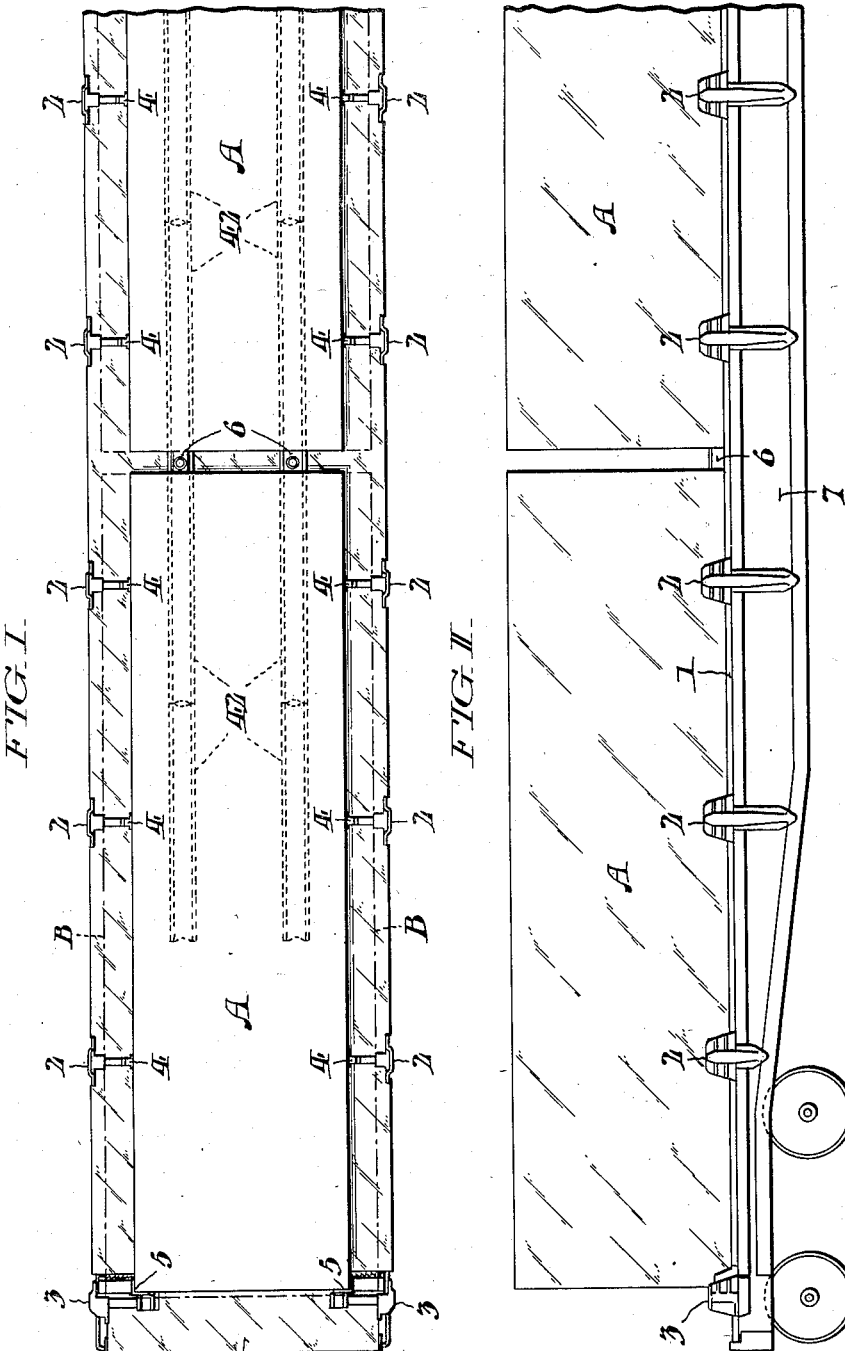
WITNESSES:
INVENTOR:
Samuel H. Owens,
BY
ATTORNEYS.

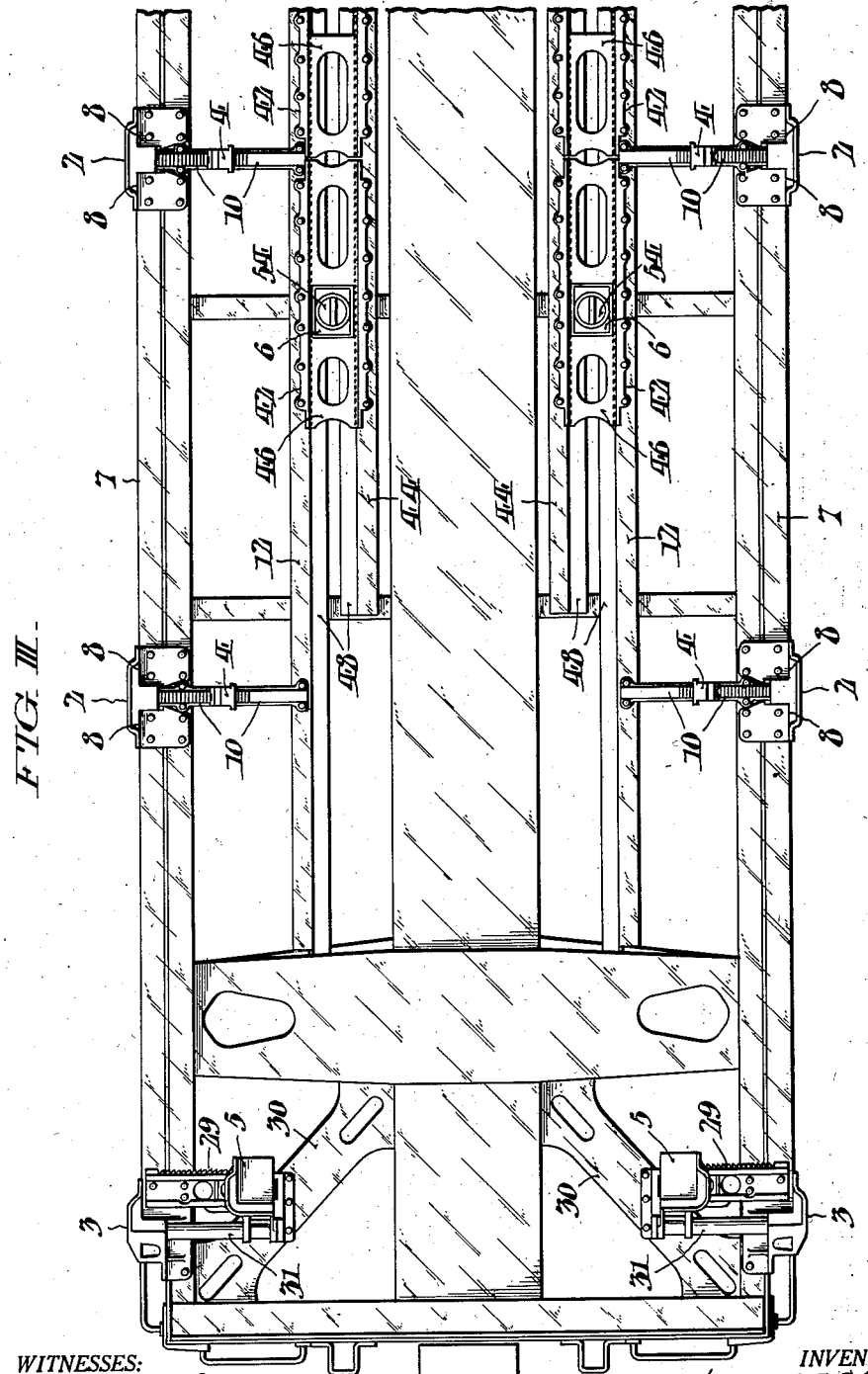

May 21, 1935.   S. H. OWENS   2,002,440
MOVABLE ABUTMENT FOR CONTAINER VEHICLES
Filed April 28, 1932   7 Sheets-Sheet 3
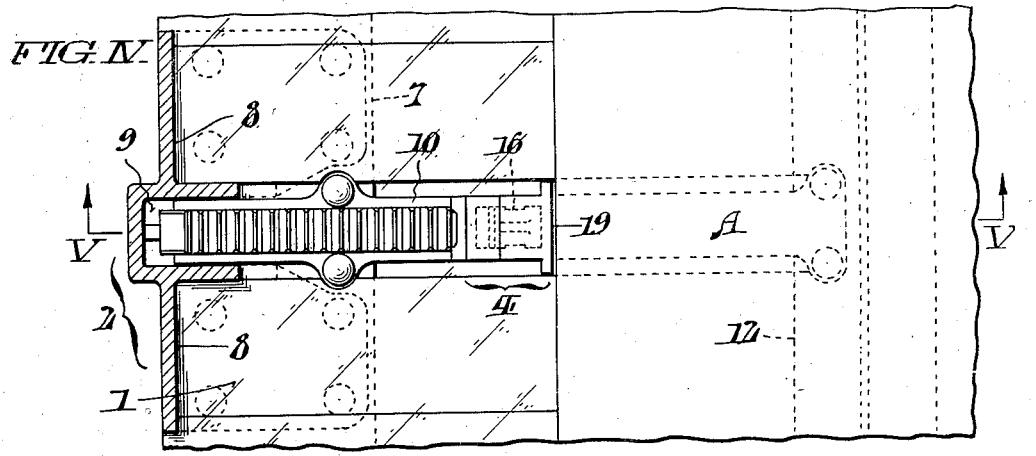
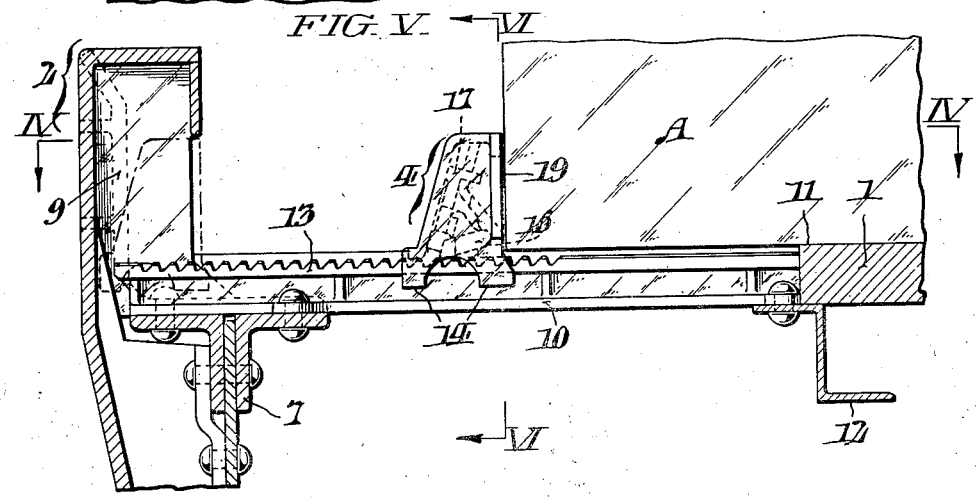
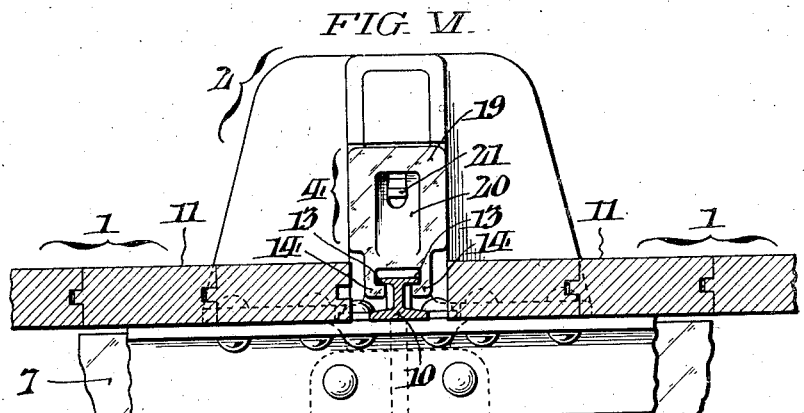

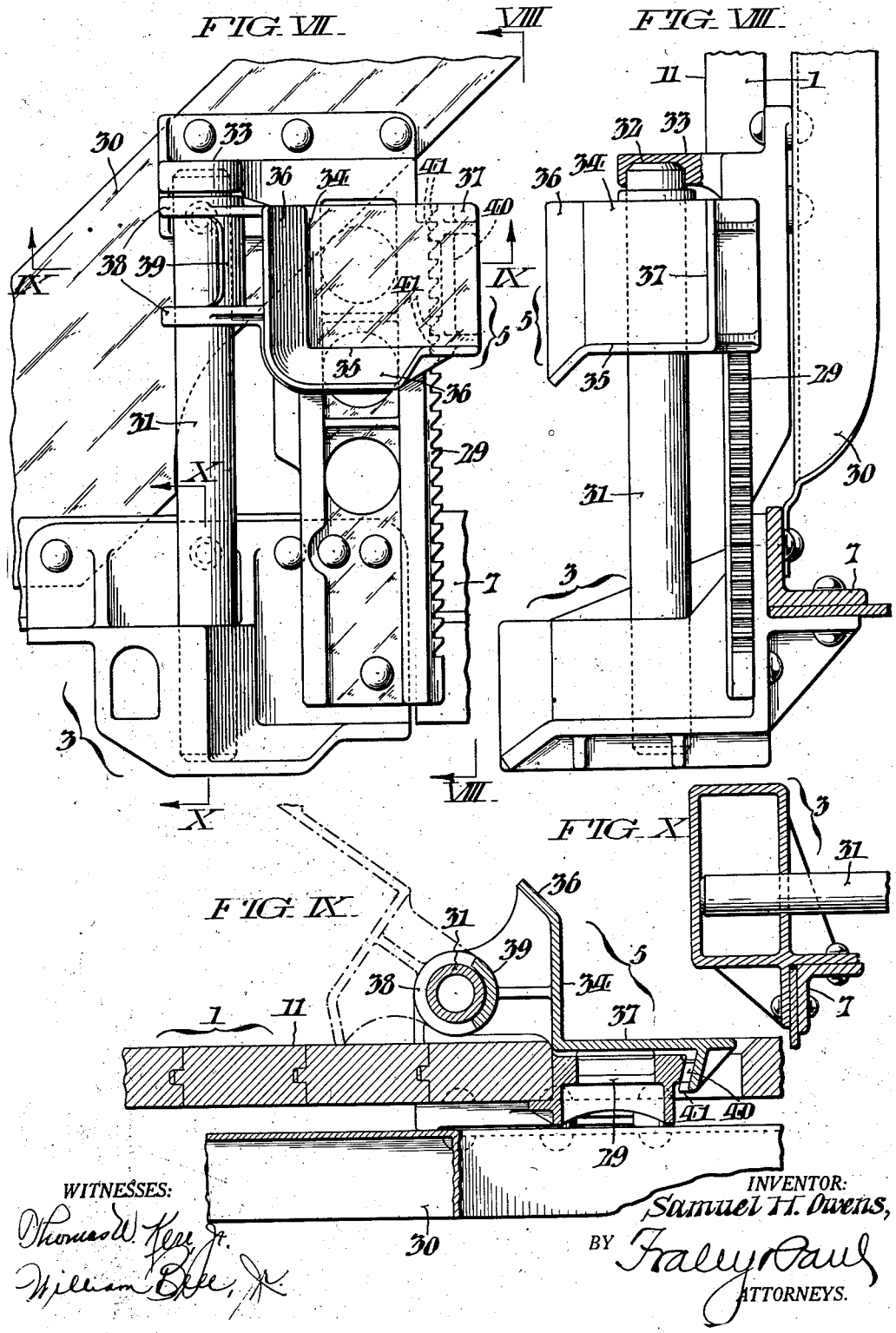

May 21, 1935.  S. H. OWENS  2,002,440
MOVABLE ABUTMENT FOR CONTAINER VEHICLES
Filed April 28, 1932  7 Sheets-Sheet 5
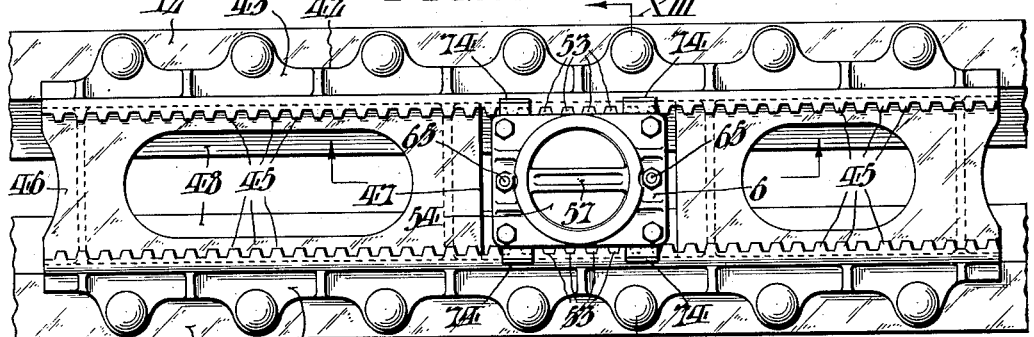
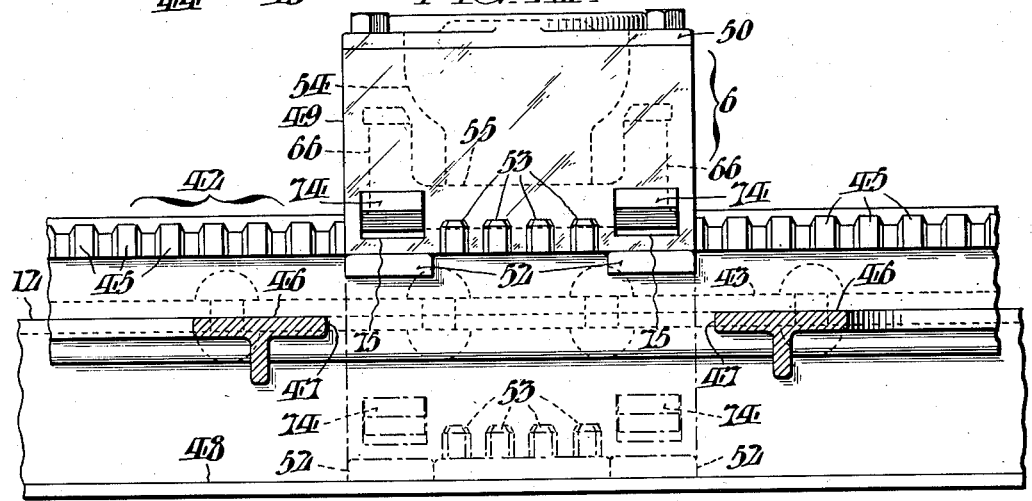
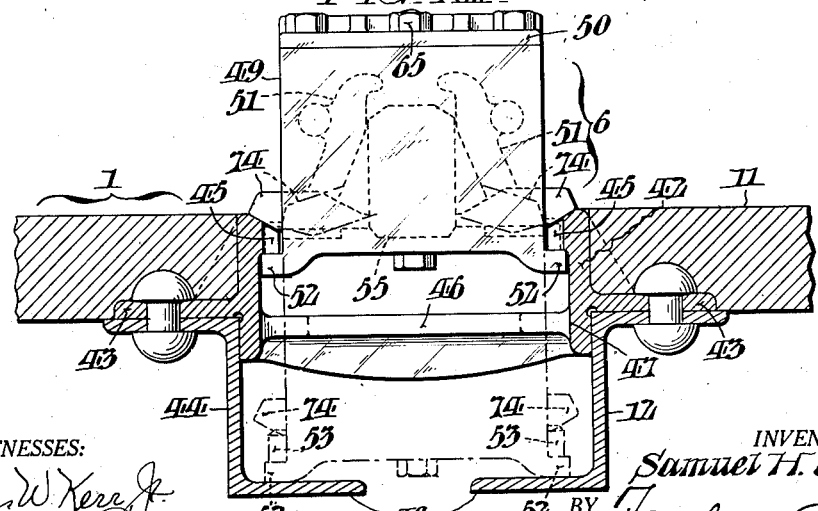

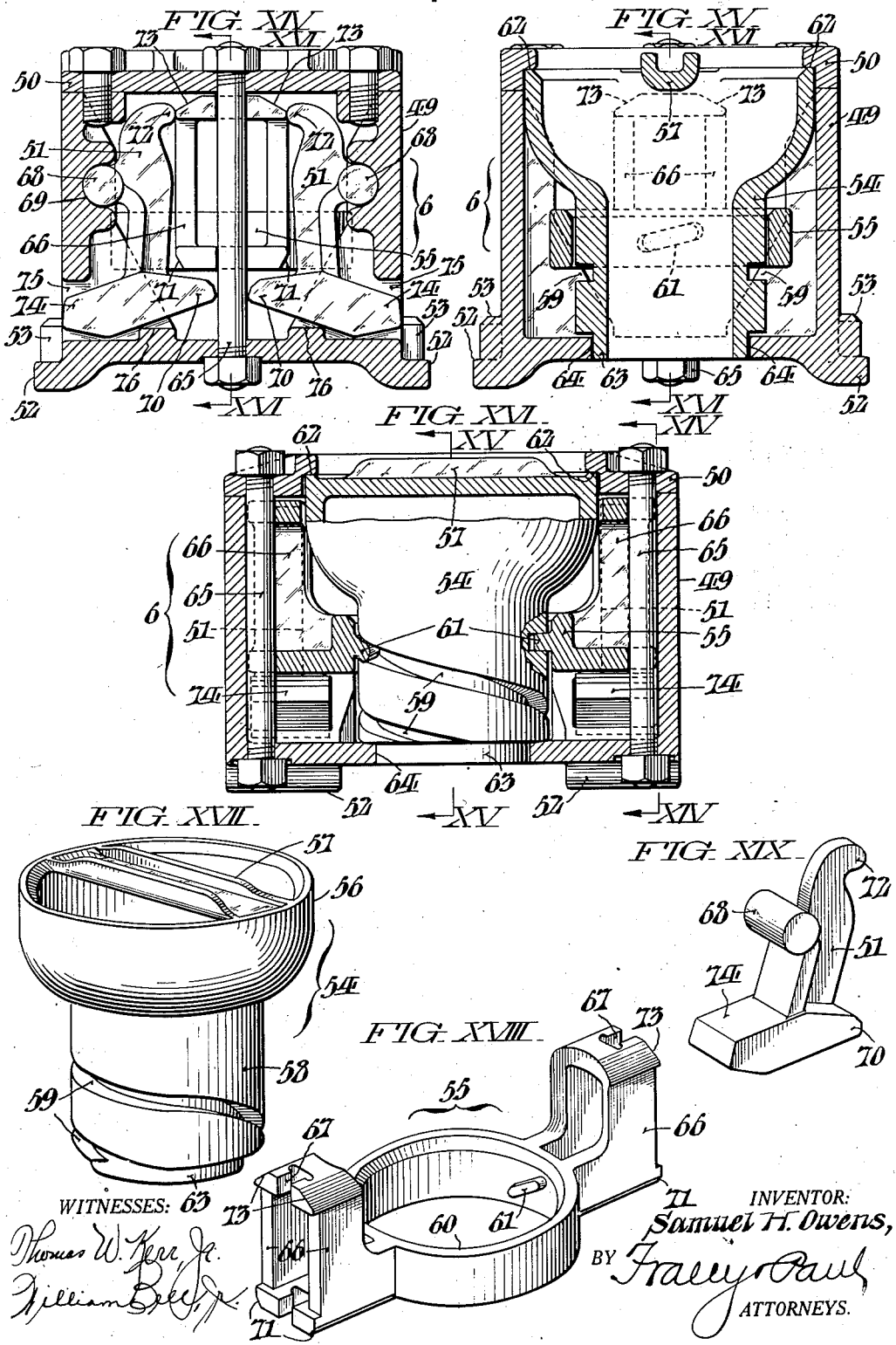

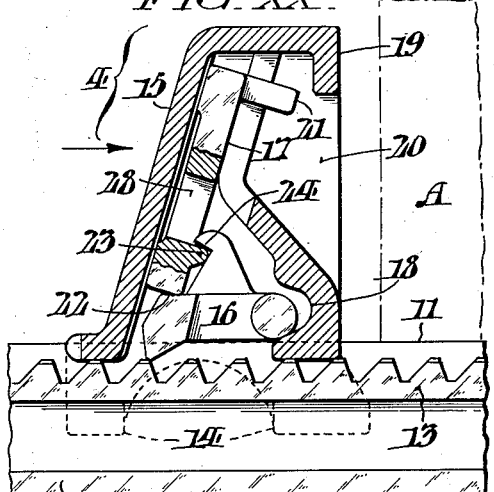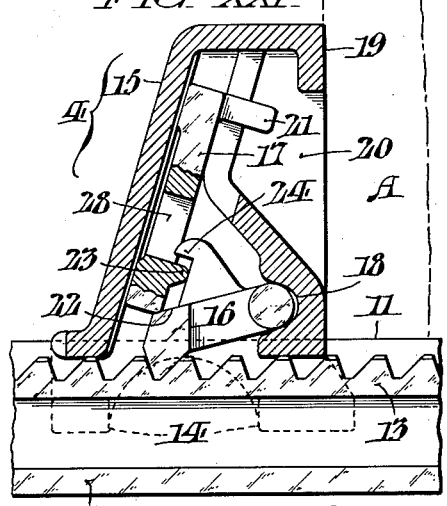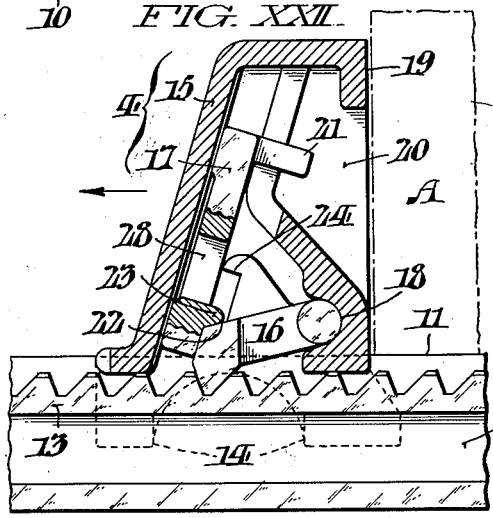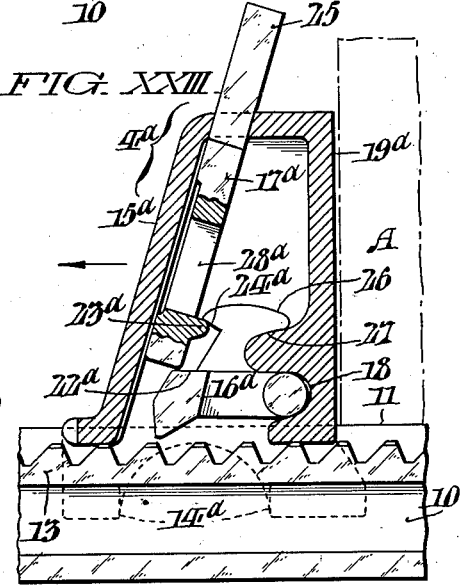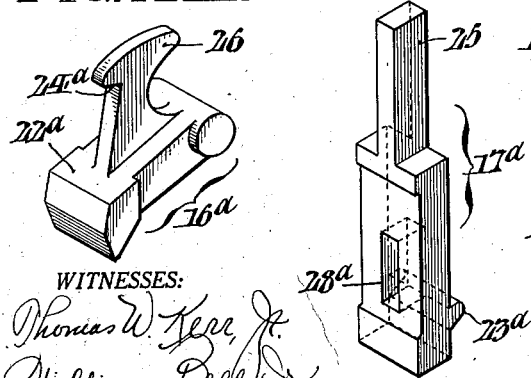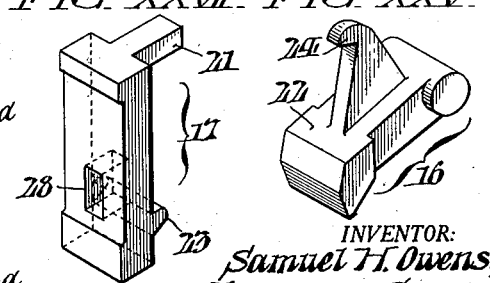

Patented May 21, 1935

2,002,440

UNITED STATES PATENT OFFICE 2,002,440

MOVABLE ABUTMENT FOR CONTAINER VEHICLES

Samuel H. Owens, Altoona, Pa.

Application April 28, 1932, Serial No. 608,007

10 Claims. (Cl. 105—366)

This invention relates generally to movable abutments for container vehicles, and more particularly to abutments movable on the platform of a railway car, motor truck, or the like, to define seats for the accommodation of shipping containers of varying base dimensions in spaced relation along the length of the vehicle platform. The invention is hereinafter described with particular reference to its embodiment in a railway flat car adapted thereby for the carrying of less-than-carload-lot containers of standard dimensions, as well as for the carrying of so-called "demountable truck bodies" which may vary considerably in length and in width.

Heretofore it has been proposed to adapt railway flat cars to the carrying of containers by placing fixed abutments in spaced relation along the sides of the car, the abutments defining seats of fixed area for the accommodation of standard size containers. However, such construction does not provide for the carrying of containers of dimensions varying from the standard size such as the truck body containers which are customarily made to a less width and greater length than the usual railway containers.

Accordingly, the principal object of this invention is to provide, in combination with the platform of a container vehicle, sets of movable abutments adjustable in a horizontal plane to define seats on the vehicle platform for containers of varying base dimensions.

A more specific object of this invention is to provide in such a container vehicle sets of fixed abutments, for defining seats of fixed area for containers of standard base dimensions, in combination with sets of movable abutments, normally housed outside the loading floor space but adapted to be moved onto such space to define seats for other types of containers of varying dimensions, whereby the advantages of rigidly attached abutments and unobstructed floor space are obtained incident to the normal use of the container vehicle, while the conversion of the vehicle for the carrying of other types of containers may be readily effected.

Another object of the invention is to provide movable abutments for such container vehicles, which abutments are of simple and rugged construction, and yet which lend themselves to ready adjustment, and are adapted to be locked in varying position to serve as stops effectively preventing shifting of the containers on the vehicle platform, and as guides facilitating the lowering of containers onto suitably spaced seats on the platform.

Still more specific objects and advantages characterizing my invention will be evident from the detailed description which follows hereinafter, of one embodiment or example of the invention, having reference to the accompanying drawings, whereof;

Fig. I represents a plan view of one end of a railway flat car, showing in diagrammatic outline truck bodies of less width and greater length than the standard size containers to which the car is primarily adapted.

Fig. II represents a side elevation of the car.

Fig. III represents and enlarged plan view of an end portion of the car of Fig. I, with the floor removed to show the vehicle frame and the manner in which the container seating abutments are fastened thereto.

Fig. IV represents an enlarged plan view of a plan view of a portion of the railway car at one of the side abutments with certain parts shown in cross section, taken as indicated by the lines IV—IV of Fig. V.

Fig. V represents a cross sectional view of such a side abutment, taken as indicated by the lines V—V of Fig. IV.

Fig. VI represents a cross sectional view of such a side abutment, taken as indicated by the lines VI—VI of Fig. V.

Fig. VII represents an enlarged plan view of combined fixed and movable end corner abutments of the car, with a portion of the floor of the car removed to show the underframe.

Fig. VIII represents a cross sectional view of such end corner abutments, taken as indicated by the lines VIII—VIII of Fig. VII.

Fig. IX represents a cross sectional view of such end corner abutments, taken as indicated by the lines IX—IX of Fig. VII.

Fig. X represents a detailed view, taken as indicated by the lines X—X of Fig. VII, showing the interior of one of the fixed end corner abutments.

Fig. XI represents an enlarged plan view of a portion of a rack disposed longitudinally of the car and of an intermediate movable abutment associated with such rack.

Fig. XII represents a longitudinal cross sectional view of a portion of the rack of Fig. XI, taken as indicated by the lines XII—XII of Fig. XI, and showing the intermediate abutment in side elevation.

Fig. XIII represents a transverse cross sectional view of the rack, and a portion of the car platform, taken as indicated by the lines XIII—XIII of Fig. XI, showing the intermediate abutment in end elevation.

Fig. XIV represents a cross sectional view of an intermediate abutment, taken as indicated by the lines XIV—XIV of Fig. XVI.

Fig. XV represents a cross sectional view of such an intermediate abutment, taken as indicated by the lines XV—XV of Fig. XVI.

Fig. XVI represents a longitudinal cross section, taken as indicated by the lines XVI—XVI of Figs. XIV and XV, showing the actuating handle in partial cross section.

Fig. XVII represents a perspective view of the actuating handle for the intermediate abutment shown in Figs. XV and XVI.

Fig. XVIII represents a perspective view of a yoke forming a part of the intermediate abutment shown in Figs. XIV, XV and XVI.

Fig. XIX represents a perspective view of the form of dog used in the intermediate abutment of Figs. XIV, XV and XVI.

Figs. XX, XXI and XXII represent in each instance a cross section of the movable side abutment in position on its rack with a portion of the container diagrammatically represented, the several views showing the latch member and pawl in different positions.

Fig. XXIII represents a similar cross sectional view of a modified form of movable side abutment.

Fig. XXIV represents a perspective view of the type of pawl used in the movable side abutment shown in Fig. XXIII.

Fig. XXV represents a perspective view of the type of pawl used in the movable side abutment shown in Figs. XX, XXI and XXII.

Fig. XXVI represents a perspective view of the type of latch member used in the movable side abutment shown in Fig. XXIII; and Fig. XXVII represents a perspective view of the type of latch member used in the movable side abutment shown in Figs. XX, XXI and XXII.

With particular reference to Figs. I and II, it will be seen that the container vehicle, selected for illustration as an example of an embodiment of my invention, comprises an ordinary railway flat car with the addition thereto of various types of abutments for defining seats for containers superimposed upon the platform 1 of the vehicle. At A there is illustrated in diagrammatic outline a container of the type generally referred to as a "demountable truck body", such container being of less width and greater length than the ordinary railway container.

In the several figures of the drawings, there are shown mounted on the platform 1 of the railway car, various types of abutments, all of which serve as stops effectively preventing shifting of containers on the floor of the car and also as guides for facilitating the lowering of the containers into their proper positions. Such abutments are conveniently classified herein as the "fixed side abutments", which are designated at 2, the "fixed end corner abutments" designated at 3, the "movable side abutments" designated at 4, the "movable end corner abutments" designated at 5, and the "movable intermediate abutments" designated at 6. All of the several forms of abutments are preferably made as rugged castings adapted to withstand the heavy usage to which freight cars are subjected in service.

The fixed side abutments 2, together with the fixed end corner abutments 3, define a plurality of rectangular seats along the side edges of the vehicle for the accommodation of containers of standard dimensions, the car being primarily adapted for carrying containers of approximately the same width as the width of the car platform 1. The fixed side abutments 2 in each instance define oppositely directed corners for engagement with adjacent corners of standard size containers. The fixed end corner abutments 3 each define a single corner for engagement with the corresponding corner of a container mounted at the end of the railway car. The movable side abutments 4 are adapted for transverse movement along the platform 1 of the vehicle toward the center line thereof to engage truck body containers such as shown at A which are of less width than the vehicle platform. The movable end corner abutments 5 are likewise adapted for transverse movement toward the center line of the platform to compensate for the changed position of the corners of the end containers when other than standard containers are used.

The intermediate movable abutments 6 are normally housed beneath the floor of the car, but are adapted to be raised and shifted longitudinally intermediate the sides of the platform to serve as spacing members between adjacent ends of a series of containers A of the non-standard type. In Fig. I there is indicated in broken lines at B, the outline of the maximum width truck body container which can be accommodated on the vehicle.

The various forms of fixed and movable abutments are hereinafter described in detail with references first to the fixed and movable side abutments 2 and 3, then to the fixed and movable end corner abutments 4 and 5, and finally to the intermediate movable abutments 6.

*The side abutments*

In the preferred example of my invention in which fixed container seating abutments are used in combination with movable container seating abutments, the fixed side abutments 2 are cast in one piece and are securely riveted to the side sills 7 of the car underframe, as shown in Fig. III, extending outward from the side sills 7 so as not to encroach upon the loading space of the car. Each fixed side abutment 2 is shaped to afford two oppositely directed corner guides 8 for accommodating corresponding corners of two adjacent containers of the standard size which the car is primarily adapted to carry. Moreover, each fixed side abutment 2 includes a hollow central portion 9 for housing the movable side abutments 4 when these abutments are not in use. A rack 10 extends from within the housing 9 of the fixed abutment 2 inward toward the center line of the car transversely of its platform 1. The outer end of each rack 10 is thus disposed beyond the side edge of the car, and its teeth are in a plane beneath the top surface 11 of the car platform 1. As shown in Fig. III each rack 10 is riveted at its outer end to one of the side sills 7 and at its inner end to a stringer 12. As shown in Fig. VI each rack 10 is of I-shaped cross section with its upper flange 13 serving as a guide for engagement with depending lugs 14 on the corresponding movable side abutment 4.

One form which the movable side abutments 4 may take is shown in Figs. XX, XXI and XXII in which the abutment comprises a casing 15, a pawl 16 freely mounted for pivotal movement within the casing, and a latch 17 for locking and unlocking the pawl. All of the parts of the movable abutments may comprise rough castings, one of the objects of the invention being to eliminate machined parts, thus reducing the cost of manufacture of the abutments, and rendering them suitable for the rough usage and severe wear to which railway cars are subjected. It will be particularly noted that instead of employing the usual type of pivoted pawl used in pawl and rack mechanism, I employ a pawl which is freely mounted upon a curved bearing surface or seat 18, and hence adapted for swinging movement about such bearing surface or seat, while having capacity for limited bodily movement away from such bearing surface or seat.

In the form of movable side abutment shown in Figs. XX, XXI and XXII the casing 15 is provided with a vertical flat wall 19 having an opening 20 therein, through which access may be had to the handle portion 21 of the latch 17, and being otherwise imperforate. Accordingly, when a movable side abutment 4 is moved inward along its rack 10 against the side of a container such as shown at A, and there automatically locked in place, the movable abutment cannot be unlocked until the container is removed from the car platform. Consequently accidental or unauthorized release of any of the movable side abutments 4 is prevented during transit of the shipping containers.

The operation of the movable side abutments 4 will be readily understood from the views, Figs. XX, XXI, and XXII, showing the various positions occupied by the pawl 16 and latch 17. In Fig. XX the the latch 17 has been lifted and the pawl 16 thereby permitted to fall by gravity away from its seat 18 to a position in which its shoulder 22 holds the latch 17 in raised or inoperative position. In this position the pawl 16 is free to slide over the teeth of the rack 10 when the movable side abutment 4 is progressed by hand in the direction indicated by the arrow. When the movable side abutment 4 is in place against the wall of a container A the pawl 16 may occupy a position such as shown in Fig. XXI, in which the pawl engages with the teeth of the rack, still maintaining the latch 17 in raised position. A slight reverse or outward movement of the movable side abutment will then cause the parts to assume the positions shown in Fig. XXII. Accompanying this reverse movement in the direction indicated by the arrow, the pawl 16 is forced firmly onto its seat 18 which permits the latch 17 to fall by gravity to a position between the casing 15 and the shoulder 22.

To return a movable side abutment 4 to its original position within the housing 9 of the corresponding fixed side abutment the container must first be lifted from its seat as before explained. The latch 17 is then raised by reaching through the opening 20 and grasping the handle portion 21. When the latch 17 is raised a lug 23 thereon strikes a projection 24 on the pawl 16 and causes the pawl to be swung upward, pivoting on its seat 18, out of engagement with the rack. The movable side abutment 4 may then be slid outward along its rack 10.

The modified form of movable side abutment shown at 4a in Fig. XXIII is similar to the previously described abutment except that access to the latch 17a is had through the top of the casing 15a. In this example the latch member is made longer to afford a handle portion 25 which projects upward through an opening at the top of the casing 15a. The wall 19a which abuts against a container is made imperforate. The pawl 16a is formed with a hook-shaped portion 26 which engages a correspondingly shaped surface 27 at the interior of the casing. The operation of the modified form of abutment 4a is similar to the operation above described except that the pawl 16a when off its seat 18 bears upon the curved surface 27 and is caused to pivot about this surface incident to free sliding along the teeth of the rack 10.

It will be readily apparent that with either form of movable side abutment the latch 17, 17a is normally inoperative when the pawl 16, 16a is off its seat 18, but is adapted to fall by gravity to lock the pawl against pivotal movement when the pawl is forced onto its seat by reverse or outward movement of the casing 15, 15a. Furthermore, as clearly shown in the perspective views of Figs. XXIV, XXV, XXVI and XXVII the pawls 16, 16a and the latches 17, 17a are so made that they can be fitted into each other for the purposes of removal from their casings 15, 15a. Thus the latches 16, 16a are provided with rectangular slots 28, 28a into which the projections 24 of the pawls will fit when it is desired to remove one of these parts through the bottom of its casing 15, 15a.

*The end corner abutments*

The fixed end corner abutments 3 are securely riveted to the side sills 7 as shown in Fig. III, and are each formed and spaced with respect to the fixed side abutments 2 to accomodate a single corner of a standard size container at the end of the car. As clearly shown in Figs. VII, VIII, IX and X there extends inward from each fixed end corner abutment 3 toward the center line of the car a rack 29. Each rack 29 is disposed just below the top surface 11 of the car platform 1 with its outer end riveted to the fixed end corner abutment 3 and to the side sill 7 and its inner end riveted to a diagonal stiffening member 30 of the car underframe. Above each rack 29 and in parallel relation therewith there is a shaft 31, the outer end of which is supported by the corresponding fixed end corner casting 3 as shown in Fig. X and the inner end of which is supported in a socket 32 on an upstanding projection 33 of the rack 29.

The movable end corner abutments 5 are mounted for sliding and swinging movement on the shafts 31. Each movable end corner abutment 5 is preferably formed with two upstanding flanges 34 and 35 at right angles to each other having outwardly inclined portions 36 near the top edges which facilitate the guiding of a container into position when it is lowered onto a car platform. Each movable end corner abutment 5 is also formed with a horizontally extending base plate 37 adapted to support a container corner. The upstanding flange 34 is provided with arms 38 connected by a sleeve portion 39 which bears upon the shaft 31, permitting a transverse sliding movement of the abutment 5 across the platform 1 of the car as well as a swinging movement about the axis of the shaft 31. Depending from the base plate 37 of each movable end corner abutment 5 there is a projection 40 having teeth 41 which are complementary to the form of the teeth of the rack 29 and adapted to register therewith when the abutment is swung downward about the shaft 31.

Normally, when a car is used for carrying standard size containers, the movable end corner abutments 5 are swung upward and backward to a position such as indicated in broken lines in Fig. IX, in which position they are well clear of the normal loading space of the car platform. When, however it is desired to carry containers of less width than the standard size container, the movable end corner abutments are placed in predetermined positions, ascertained by measurement of the containers, so that a pair of such abutments at the end of the car will snugly accommodate the end of one of the containers. The abutments 5 are so spaced at varying distances from the edge of the car by sliding them transversely of the car platform along the shafts 31 and then swinging them forward and downward to register with the teeth of the rack 29. When set in proper spaced relation on the car platform the movable end corner abutments 5 are automatically locked in place by the seating of the containers thereon, the weight of the end containers resting on the base plates 37 of the abutments.

The particular combination of rack and movable end corner abutment described as above represents but one of many forms contemplated by my invention for the seating of the end corners of containers of non-standard base dimensions. Obviously, many forms of notched members other than the particular type of rack 29 here shown may be used for the adjustment of a movable corner abutment.

*The intermediate abutments*

The intermediate movable abutments 6 are guided for longitudinal movement along racks 42 which are inlaid in the car platform 1 and riveted thereto as clearly shown in Figs. III and XI, there being two such racks employed in the present example of the invention. The racks 42 are riveted along their side flanges 43 to the top of flanges of the stringers 12 and of addition stringers 44 of the car underframe.

Each rack 42 has a double row of teeth 45 facing each other. The opposite sides of each rack are joined together by flat horizontal webs 46 which define with the sides a longitudinal channel along which an intermediate abutment 6 is guided for movement lengthwise of the car platform 1. At spaced intervals along each rack 42 there are rectangular openings 47 of a size permitting one of the intermediate abutments to be dropped therethrough to a position as indicated in broken lines in Fig. XIII in which the abutment rests upon the lower flanges 48 of the stringers 12 and 44. The intermediate abutments 6 are normally housed within the rectangular openings 47 with their top surfaces below the top surface 11 of the car platform. A sufficient number of intermediate abutments 6 are provided at spaced intervals along the length of the car to take care of the maximum number of non-standard containers which the car is likely to carry. Moreover, while as shown in Fig. I, there is but one pair of intermediate abutments between successive containers A, it will be readily apparent that if it is desired to space the containers at a greater distance from each other this can be accomplished by bringing up another pair of intermediate abutments from beneath the car platform 1 so that there are two pairs of such abutments spaced as desired between adjacent containers.

The intermediate abutments, as shown in detail in Figs. XIV, XV and XVI, each comprise a rectangular casing 49, with a top 50 bolted thereto, opposite pairs of dogs 51 pivoted for swinging movement within the casing, and actuating mechanism for causing the dogs 51 to swing outward for engagement with the top edges of a rack 42 or to be returned to housed position within the casing. At the base of the casing 49 there are laterally extending flanges 52 which project at each side beneath the teeth 45 of the rack 42 and prevent the intermediate abutment 6 from being removed from the car platform. When an intermediate abutment 6 is being shifted longitudinally upon its rack 42 the laterally extending flanges 52 slide freely in the channel formed between the horizontal webs 46 and the underside of the teeth 45. Immediately above the laterally extending flanges 52 the casing 49 is formed with teeth 53 which, as shown most clearly in Figs. XI and XII, are of complementary shape to the teeth 45 of the rack 42 and are adapted to register with the latter teeth when the intermediate abutment 6 is in operative or fully elevated position.

The actuating mechanism for causing the dogs 51 to be moved inward or outward comprises generally an actuating handle 54, shown in perspective in Fig. XVII and a yoke 55 shown in perspective in Fig. XVIII. The actuating handle 54 includes an upper bowl 56 having a hand grip 57 across the top thereof and a lower cylindrical portion 58 helically grooved as indicated at 59. The yoke 55 includes an annulus 60 adapted to accommodate the actuating handle 54 and having opposite lugs 61 which work in the helical groove 59. The actuating handle 54 is restrained against vertical movement by means of a shoulder 62 on the casing top 50. At the base of the cylindrical portion 58 there is provided a journal 63 which fits within a bearing 64 in the base of the casing 49. Consequently a turning movement of the actuating handle 54 causes the yoke 55 to move upward or downward within the casing 49, according to the direction of turning, through the action of the lugs 61 riding the helical groove 59. The yoke 55 is held against rotation and guided in its vertical travel by long bolts 65 which pass through the casing at the sides thereof. As shown in Fig. XVIII, the yoke 55 has wing portions 66 which are notched at their extremities, as indicated at 67, the notches fitting around the bolts 65.

The swinging dogs 51 each include cylindrical portions 68 normally fulcrumed on curved seats 69 at the sides of the casing 49. The dogs 51 are freely mounted and are readily removable. Each dog 51 has near the base thereof an inwardly projecting angular formation or butt 70 adapted to be engaged by the lower edge 71 of the adjacent wing portion 66. Near the top of the dog 51 there is a curved projection or toe 72 adapted to be engaged by the upper edge 73 of the adjacent wing portion 66. Thus when the yoke 55 is raised or lowered in the casing 49 the dogs 51 are caused to be swung inward or outward respectively. When swung outward the outwardly projecting portions 74 engage the rack 42 at the top edges of the teeth 45 as shown in Fig. XIII. Outward swinging of the opposite pairs of dogs 51 is caused by downward movement of the yoke 55 within the casing 49. As the yoke 55 moves downward the lower edges 71 of the wing portions 66 strike the butts 70 of the dogs and force the same outward through the openings 75 at the sides of the casing 49. When thus extended the strain is relieved from the curved seats 69 and taken up by seats 76 at the base of the casing 49. When the yoke 55 is moved upward by turning the actuating handle in the opposite direction the upper edges 73 of the wing portions 66 strike the toes 72 of the dogs 51 and cause them to be swung inward to their original positions.

It will be noted that the various movable parts of the intermediate abutments may be made as rough castings, rather than machined parts, and may be readily assembled and disassembled.

From the above description of the intermediate container seating abutments 6 it will be apparent that these abutments may rest in any one of three vertical positions. The intermediate abutments 6 are normally housed within the openings 47, which are located at intervals along the racks 42, beneath the top surface 11 of the car platform 1. When it is desired to employ an intermediate abutment 6 for the spacing of non-standard containers on the platform, the abutment is raised from its housing and shifted longitudinally within the channel formed above the horizontal webs 46 of the racks 42 to the desired distance from the ends of the car, or, if the container be seated, to the end wall of the container. The operator then raises the abutment 6 by grasping the hand grip 57 and guiding the teeth 53 at the sides of the abutment through the teeth 45 at opposite sides of the rack 42. When the abutment has thus been raised to fully elevated position the actuating handle is turned to project the lugs 51 outward to engagement with the top edges of the rack 42, thus locking the abutment.

From the above description it will also be apparent that when a railway flat car such as shown in the drawings is to be used for the transportation of standard size containers, all of the movable abutments are housed outside of the normal loading space of the car, the movable side abutments 4 being housed within the fixed side abutments 2, the movable end corner abutments 5 being swung outward at the ends of the car, and the movable intermediate abutment 6 being housed beneath the car platform 1. When the movable abutments are thus housed the car has an unobstructed floor space and may be used as an ordinary flat car for other purposes than the carrying of containers. On the other hand, when it is desired to carry truck body containers, such as indicated at A, or other containers of less width or of greater length than the standard type, the various movable abutments are shifted in the manner described to define seats for accommodating the containers in the desired spaced relation.

While I have described a railway car fitted with particular examples of abutments of my invention, it will be apparent that the invention is not confined to railway cars, but may be applied to other types of container carrying vehicles; and that the specific forms of abutments herein illustrated and described may be varied to considerable extent as to their form, location and method of operation, all without departing from the spirit of my invention as defined in the claims annexed hereto.

Having thus described my invention, I claim:

1. In a vehicle for carrying containers of the character described, a vehicle platform having a normally unobstructed floor space, abutments positively attached to said platform but freely movable transversely and along the surface of the platform toward the center line thereof and additional abutments freely movable longitudinally and along the surface of the vehicle and defining with said first abutments rectangular seats for the accommodation of containers of varying base dimensions as to width and length, in spaced relation along the length of the platform, each said abutment having capacity for locking engagement with said platform.

2. In a vehicle for carrying containers of the character described, a platform having a normally unobstructed floor space, and abutments positively attached to said platform but freely movable along the top surface of said platform to define rectangular seats for the accommodation of containers of varying base dimensions as to width and length in spaced relation along said floor space, each said abutment having capacity for locking engagement with said platform.

3. In a vehicle for carrying containers of the character described, a vehicle platform having a normally unobstructed floor space, abutments positively attached to points spaced along said platform near the side edges thereof and freely movable transversely and along the surface of the platform toward the center line, and additional abutments intermediate the sides of the platform and positively attached thereto, said intermediate abutments being freely movable longitudinally and along the surface of the platform and defining with said first abutments rectangular seats for the accommodation of containers of varying base dimensions as to width and length in spaced relation along the length of the platform, each of said abutments having capacity for locking engagement with said platform.

4. In a vehicle for carrying containers of the character described, a platform having a normally unobstructed floor space, abutments spaced along said platform near the side edges thereof and freely movable transversely and along the surface of the platform toward the center line, and additional abutments normally housed beneath said platform freely movable vertically and longitudinally along the surface thereof and defining with said first abutments rectangular seats for the accommodation of containers of varying sizes along said floor space, all of said abutments having capacity for locking engagement with said platform, and for positively guided movement thereon.

5. In a vehicle for carrying containers of the character described, a vehicle platform, side abutments freely movable transversely and along the surface of the platform toward the center line, end corner abutments movable transversely and along the surface of the platform toward the center line, and abutments movable longitudinally along the surface of the platform intermediate the sides, said abutments defining rectangular seats for the accommodation of containers of varying base dimensions as to width and length in spaced relation along the length of the platform, and said movable abutments having capacity for locking engagement with said platform, and for positively guided movement thereon.

6. In a vehicle for carrying containers of the character described, a vehicle platform, fixed abutments spaced at the sides of the platform to define rectangular seats therealong for the accommodation of containers of predetermined base areas; and freely movable abutments on said platform including side abutments movable transversely along the surface of said platform and toward the center line, end corner abutments movable transversely along the surface of said platform and toward the center line, and intermediate abutments movable longitudinally and along the surface of the platform; said movable abutments defining rectangular seats for the accommodation of containers of varying base dimensions as to width and length in spaced relation along the length of the vehicle, and having capacity for locking engagement with said platform and for positively guided movement thereon.

7. In a vehicle for carrying containers of the character described, a platform, abutments movable longitudinally along the surface of the platform and having capacity for locking engagement therewith, racks extending transversely across said platform, abutments guided for movement along said racks and having walls against which a container is adapted to be seated, means housed within said latter abutments for automatically locking the same in any desired position along said racks, and means for releasing said latter abutments accessible only through the seating wall of said abutments, said abutments movable transversely of said platform forming cooperatively with said abutments movable longitudinally thereof, rectangular seats for the accommodation of containers of varying base dimensions.

8. In a vehicle for carrying containers of the character described, a platform, fixed container seating abutments near the edges of said platform, abutments normally housed within said fixed abutments and positively attached to said platform, but adapted to be moved inward along said platform toward the center line, and abutments positively attached to the platform but movable longitudinally along the surface of said platform defining with said other abutments rectangular seats for the accommodation of containers of varying base dimensions, all of said movable abutments having capacity for locking engagement with said platform.

9. In a vehicle for carrying containers of the character described, a platform, fixed container seating abutments near the edges of said platform, racks extending inward along said platform from said fixed abutments, abutments normally housed within said fixed abutments but movable on said racks and having capacity for locking engagement therewith, and abutments movable longitudinally of said platform and having capacity for locking engagement therewith, all of said abutments acting in cooperative operation to define rectangular seats for the accommodation of containers of varying base dimensions and being positively attached to said platform.

10. A vehicle for carrying containers of the character described having a platform and fixed abutments spaced along the sides of the platform to define rectangular seats for the accommodation of a container of predetermined base dimensions, characterized by additional abutments freely movable longitudinally and transversely along the surface of the platform and positively attached thereto and with locking capacity, the abutments movable transversely being placed adjacent to corresponding fixed abutments.

SAMUEL H. OWENS.